United States Patent
Paolini et al.

(10) Patent No.: US 12,509,039 B2
(45) Date of Patent: Dec. 30, 2025

(54) METHOD FOR CONTROLLING A BRAKING SYSTEM WITH BBW TECHNOLOGY FOR THE DISTRIBUTION OF BRAKING FORCES FOR SERVICE BRAKING OF A VEHICLE

(71) Applicant: Brembo S.p.A., Bergamo (IT)

(72) Inventors: Davide Paolini, Bergamo (IT); Andrea Maria Rosotti, Bergamo (IT); Matteo Folatti, Bergamo (IT); Samuele Mazzoleni, Bergamo (IT)

(73) Assignee: Brembo S.p.A., Bergamo (IT)

( * ) Notice: Subject to any disclaimer, the term of this patent is extended or adjusted under 35 U.S.C. 154(b) by 56 days.

(21) Appl. No.: 18/715,144

(22) PCT Filed: Nov. 30, 2022

(86) PCT No.: PCT/IB2022/061583
§ 371 (c)(1),
(2) Date: May 31, 2024

(87) PCT Pub. No.: WO2023/100096
PCT Pub. Date: Jun. 8, 2023

(65) Prior Publication Data
US 2025/0042374 A1   Feb. 6, 2025

(30) Foreign Application Priority Data
Dec. 3, 2021  (IT) .......................... 102021000030635

(51) Int. Cl.
*B60T 8/26* (2006.01)
*B60T 8/17* (2006.01)
(Continued)

(52) U.S. Cl.
CPC ............ *B60T 8/261* (2013.01); *B60T 8/1706* (2013.01); *B60T 8/171* (2013.01); *B60T 8/172* (2013.01);
(Continued)

(58) Field of Classification Search
CPC ......... B60T 8/261; B60T 8/1706; B60T 8/171
See application file for complete search history.

(56) References Cited

U.S. PATENT DOCUMENTS 9,868,425 B2 *  1/2018  Fushimi ................ B60T 11/101
2004/0200676 A1  10/2004  Chang et al.
(Continued)

FOREIGN PATENT DOCUMENTS

| EP | 2554444 A2 | 2/2013 |
|---|---|---|
| GB | 2076087 A | 11/1981 |

OTHER PUBLICATIONS

European Patent Office, International Search Report and Written Opinion in Application No. PCT/IB2022/061583, dated Feb. 3, 2023, 9 pages, Rijswijk, Netherlands.

*Primary Examiner* — Long T Tran
(74) *Attorney, Agent, or Firm* — Marshall & Melhorn, LLC

(57) ABSTRACT

A method for controlling a braking system of a vehicle for the distribution of braking torques for service braking. The method may include receiving, by an electronic control unit, a request to apply a braking torque during a braking time interval. The method may also include enabling, in the braking time interval, by the electronic control unit a first and/or second electrical actuation signal of first and/or second brake calipers. Braking torques may be applied when the signals are enabled. For each instant of the braking time interval, an amplitude of the braking torque required for service braking is equal to the sum of a first amplitude of the first braking torque and a second amplitude of the second braking torque.

13 Claims, 5 Drawing Sheets

(51) Int. Cl.
*B60T 8/171* (2006.01)
*B60T 8/172* (2006.01)

(52) U.S. Cl.
CPC ....... *B60T 2210/12* (2013.01); *B60T 2220/04* (2013.01); *B60T 2250/02* (2013.01); *B60T 2270/82* (2013.01)

(56) References Cited

U.S. PATENT DOCUMENTS

| | | | |
|---|---|---|---|
| 2010/0147633 A1 | 6/2010 | Kim | |
| 2013/0075180 A1* | 3/2013 | Hombo | B62K 25/283 180/219 |
| 2017/0021895 A1* | 1/2017 | Yasukawa | B62K 11/00 |
| 2018/0106318 A1* | 4/2018 | Cavanna | B60T 13/662 |
| 2024/0132027 A1* | 4/2024 | McKendrick | B60T 13/745 |
| 2024/0270223 A1* | 8/2024 | Auguste | F16D 55/226 |
| 2024/0391436 A1* | 11/2024 | Mazzoni | B60T 8/173 |
| 2024/0400013 A1* | 12/2024 | Mazzoni | F16D 65/0012 |

\* cited by examiner

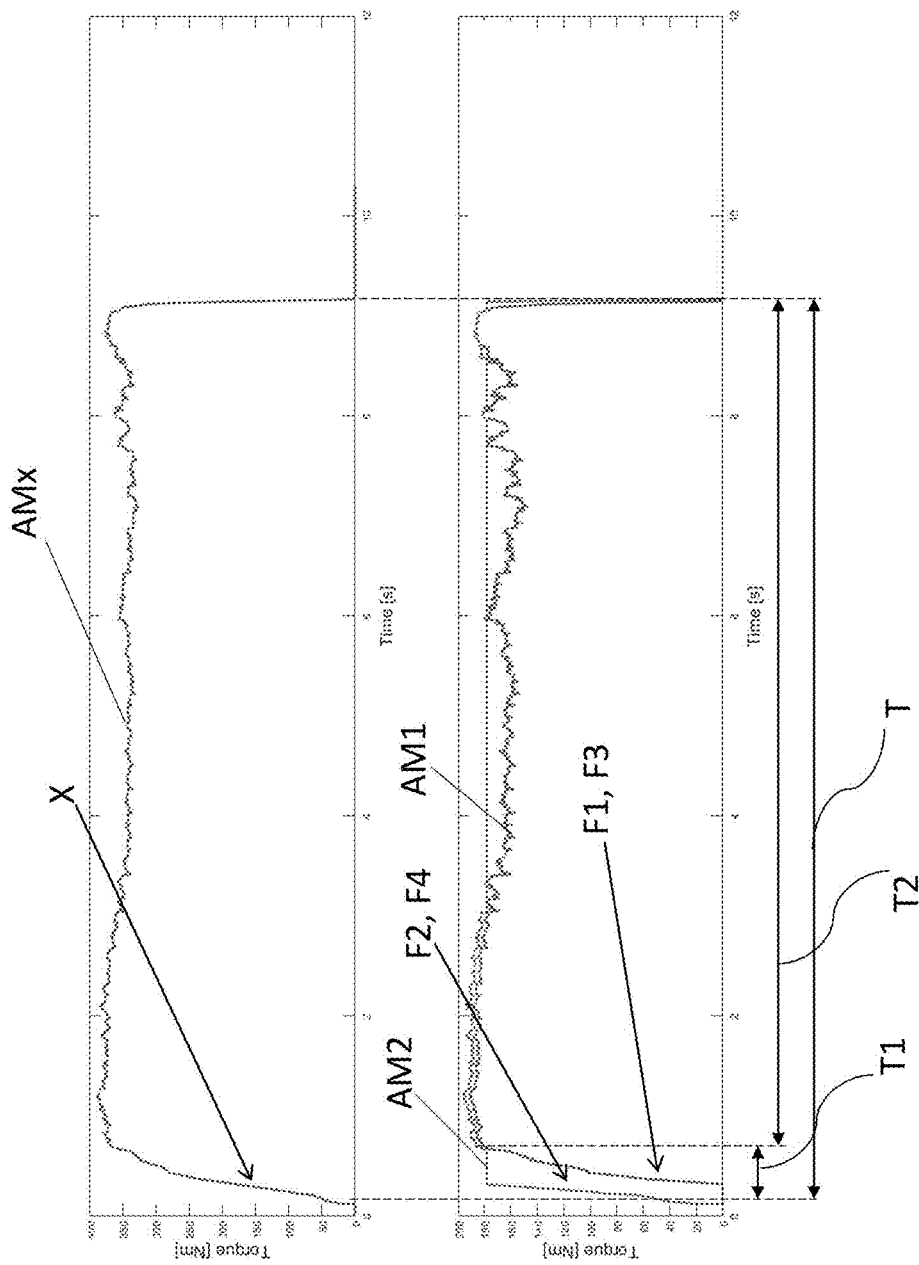

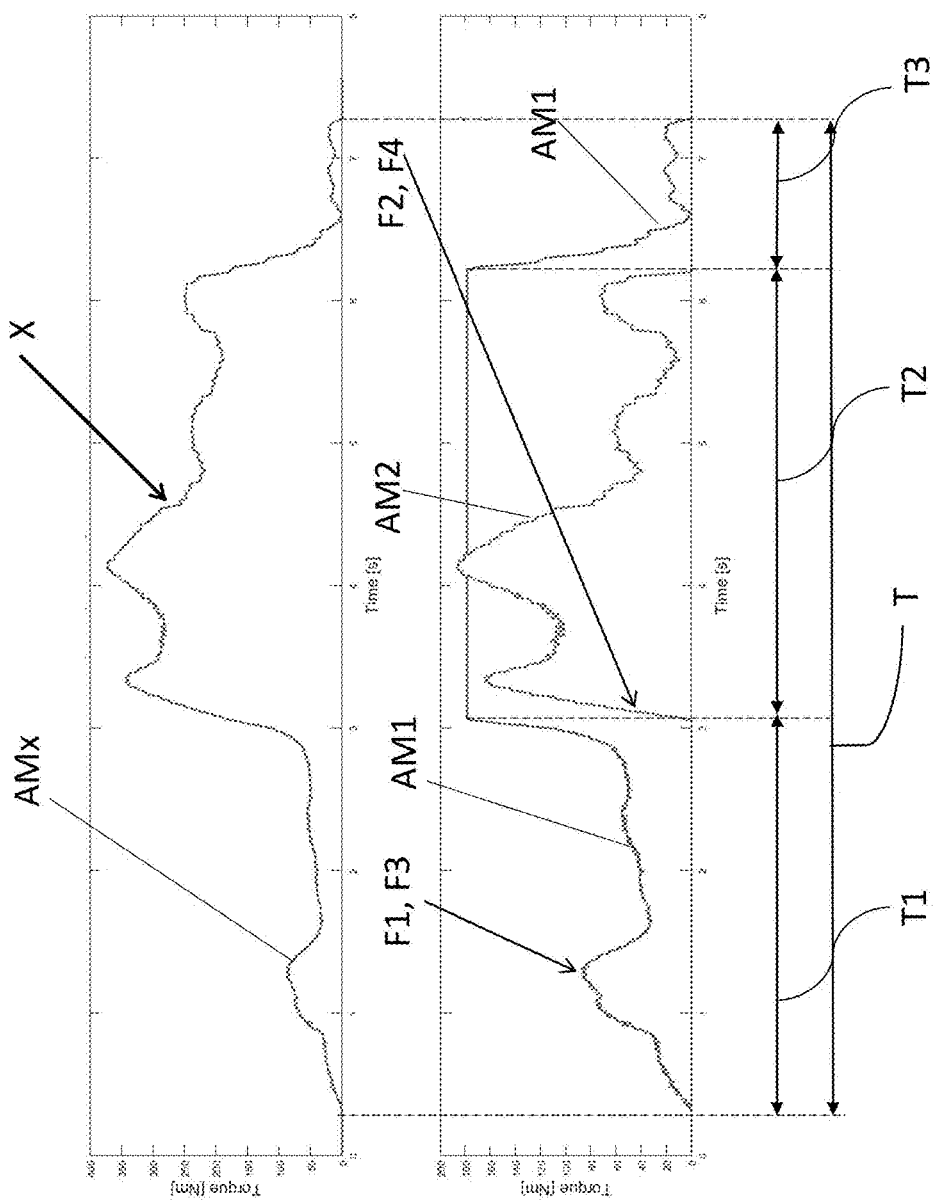

METHOD FOR CONTROLLING A BRAKING SYSTEM WITH BBW TECHNOLOGY FOR THE DISTRIBUTION OF BRAKING FORCES FOR SERVICE BRAKING OF A VEHICLE

FIELD

The present invention relates to the field of braking systems of a vehicle operating with Brake-by-Wire (BBW) technology. In greater detail, the present invention relates to a method for controlling the distribution of braking forces generated by the braking system for service braking of the vehicle, where such a braking system comprises at least two brake calipers associated with a wheel of the vehicle which can be controlled independently of each other by the system with BBW technology.

BACKGROUND

A braking system of a vehicle operating with Brake-by-Wire (BBW) technology comprises a plurality of disc brakes each associated with one wheel of the motor vehicle.

Each disc brake comprises at least one brake caliper which can be actuated to clamp on the disc, locking it to stop the vehicle in the case of service braking. The braking system involves the use of an electronic control unit (or ECU) and electrohydraulic or electromechanical actuators controlled by such an electronic control unit to act on the brake calipers, enabling/disabling the clamping of the calipers.

A traditional braking system comprises configurations in which two or more calipers are present and act on a single vehicle wheel. Such a choice can be determined by the need to solve problems of space or to have more braking torque or to implement CBS (Combined Braking System) and ABS (Anti Blockier System) braking control strategies in a braking system equipping a motorcycle, such a motorbike for example.

Indeed, in the motorcycle field, braking system configurations are known in which two different calipers are present and act on the front (or rear) wheel of the motorbike. For example, a first caliper is controlled by the conventional hydraulic-type braking system through a lever/pedal command. In this case, a clamping pressure of the caliper is controlled directly by the rider and cannot be changed during a service braking. A second caliper is controlled through the lever/pedal command, i.e., by the hydraulic system, through an electronic control unit, such as the ABS or CBS control unit.

A drawback of such a configuration of the motorbike braking system is that the braking torques generated by the two calipers cannot be coordinated according to a specific control logic because the pressure sources applied to the caliper actuators, and therefore the generated braking forces (or braking torques), are mutually distinct because they are generated by two different and separate entities, in particular the rider and the ABS or CBS control unit.

In another configuration of the conventional braking system for motorcycle applications, a single hydraulic connection line is expected to be used for both calipers mounted on a wheel of the motorcycle. In particular, the hydraulic actuation pressure applied to the calipers is generated by a single command, but such a hydraulic pressure is applied equally to the two calipers.

This results in a doubled braking effect on the wheel once both calipers clamp at the same time on the disc. One drawback of such a doubled braking effect is the creation of an unpleasant feeling for the rider, especially when applying such a configuration to light motorcycles.

Therefore, a strong need is felt to devise a solution allowing a more effective control of two or more calipers acting on the same wheel of a motor vehicle or motorcycle, allowing the limitations and drawbacks of known configurations of a traditional braking system to be overcome.

SUMMARY

It is an object of the present invention to devise and provide a method for controlling the distribution of braking torques generated by a braking system of a vehicle, e.g., a motor vehicle or a motorcycle, where such a braking system comprises at least two calipers for one or more wheels of the vehicle, which allows the two braking torques generated on the wheel to be controlled independently allowing the limitations and drawbacks of known configurations of a traditional braking system to be overcome.

Such an object is achieved by a method for controlling a braking system of a vehicle according to the claims described herein.

In particular, through the braking system of a vehicle operating with Brake-by-Wire (BBW) technology which implements the method of the invention, it is possible to independently control the braking torques generated by each caliper on the individual wheel leading to maximizing the comfort for the driver (or rider in the case of motorcycle applications) and optimizing performance during high-performance braking, such as in the case of ABS braking, for example.

The present invention also relates to a vehicle braking system comprising at least one electric control unit operating to control the distribution of braking torques generated on the vehicle wheel according to the claims described herein.

Some advantageous embodiments are the subject of the dependent claims.

DESCRIPTION OF THE FIGURES

Further features and advantages of the control method according to the invention will become apparent from the description given below of preferred embodiments thereof, given by way of non-limiting examples, with reference to the accompanying drawings, in which:

FIGS. 3A-3B show, in a first example, diagrams as a function of time, of respectively:

Figure 5A:
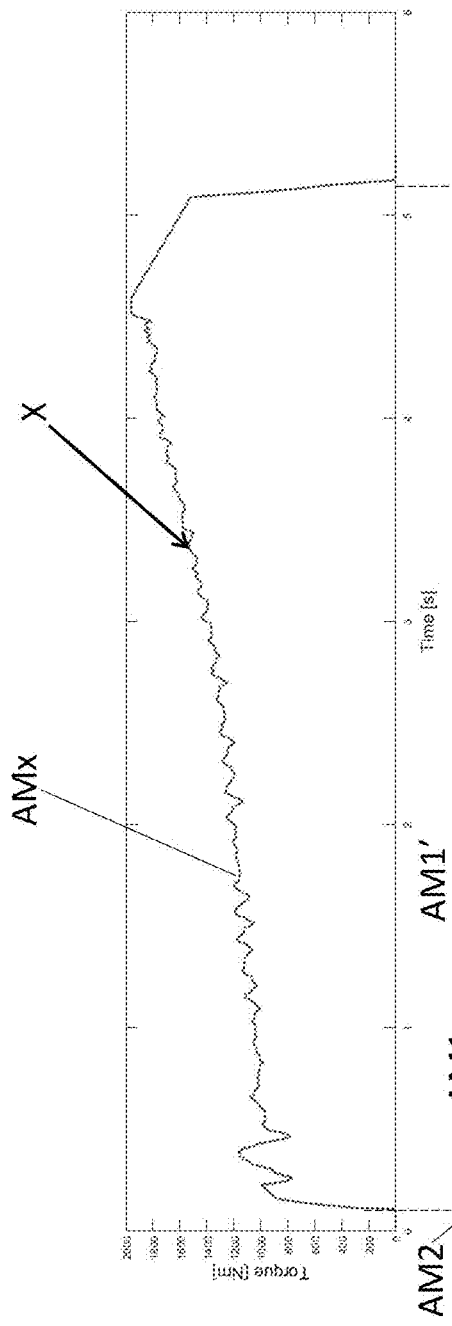
Figure 5B:
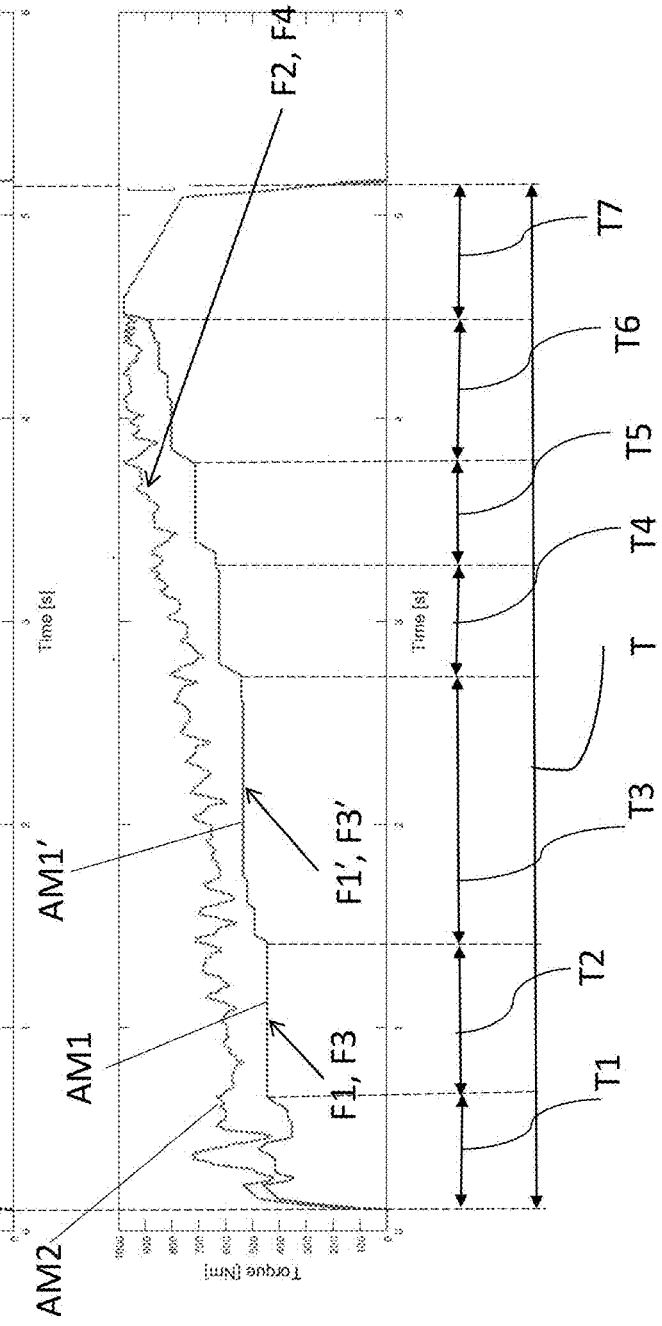

a braking torque required for service braking upon a braking action applied to a lever or pedal of the vehicle braking system, a first and a second braking torque applied in response by the first and second brake calipers to the vehicle wheel;

FIG. 4A-4B show, in a second example, diagrams as a function of time, of respectively:

a braking torque required for service braking upon a braking action applied to a lever or pedal of the vehicle braking system, a first and a second braking torque applied in response by the first and second brake calipers to the vehicle wheel;

FIGS. 5A-5B show, in a third example, diagrams as a function of time, of respectively:

a braking torque required for service braking in ABS configuration upon a braking action applied to a lever or pedal of the vehicle braking system, a first and a second braking torque applied in response by the first and second brake calipers to the vehicle wheel during the ABS event.

Similar or equivalent elements in the aforesaid figures are indicated by the same reference numerals.

DETAILED DESCRIPTION

Figure 1:
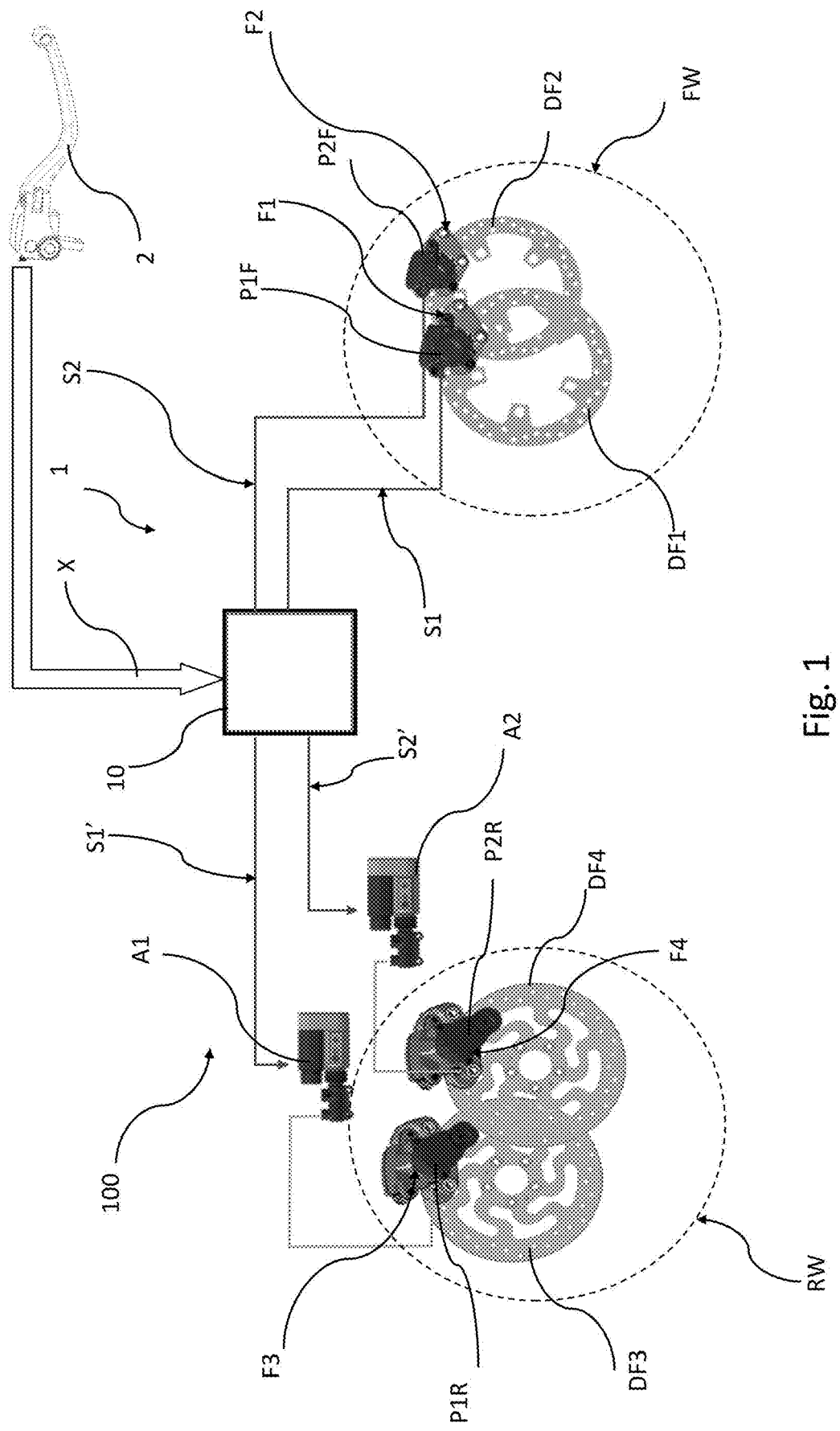
FIG. 1 diagrammatically shows an example of a braking system of a vehicle, in particular a motorcycle, such as a motorbike, for example, which implements a method of controlling the distribution of braking torques for service braking of the present invention.

With reference to FIG. 1, reference numeral 100 indicates as a whole a braking system of a vehicle 1 which implements a method for controlling the distribution of braking forces or braking torques for service braking of the vehicle 1 according to the present invention.

For example, the braking system 100 is an architecture with Brake-by-Wire (BBW) technology.

For the purposes of the present description, "vehicle" means any motor vehicle or motorcycle, even of commercial type, having two, three, four, or more wheels. For example, vehicle means a motorcar, a motorbike, a light commercial vehicle, a heavy industrial vehicle or any other vehicle which requires a braking system to reduce the speed of the moving parts.

For simplicity, an example of a braking system 100 of a motorbike 1 is described with reference to FIG. 1. However, the properties and advantages of the present invention are also applicable to braking systems of vehicles of different type.

Furthermore, "braking system" means the whole of all the components (from mechanical and/or electric or electronic components to the brake fluid) which contribute to generating the service braking of a vehicle.

With reference to FIG. 1, the motorbike 1 comprises a front wheel FW and a rear wheel RW, diagrammatically depicted by circumferences in a dotted line in FIG. 1.

The braking system 100 comprises a first DF1 and a second DF2 brake disc operatively associated with the front wheel FW of the motorbike 1.

The braking system 100 further comprises a third DF3 and a fourth DF4 brake disc operatively associated with the rear wheel RW of the motorbike 1.

In the example in FIG. 1, the braking system 100, further, comprises a first P1F, P1R and at least a second P2F, P2R brake caliper associated with both the front wheel FW and the rear wheel RW of the motorbike 1, respectively.

In an alternative embodiment, the braking system 100 comprises a first P1F and at least a second P2F brake caliper associated with the front wheel FW of the motorbike 1 and a single brake caliper P1R (or P2R) associated with the rear wheel RW of the motorbike 1.

In a further alternative embodiment, the braking system 100 comprises a first P1R and at least a second P2R brake caliper associated with the rear wheel RW of the motorbike 1 and a single brake caliper P1F (or P2F) associated with the front wheel FW of the motorbike 1.

In greater detail, referring to the example in FIG. 1, the first P1F and the at least a second P2F brake caliper associated with the front wheel FW are electro-actuated brake calipers electrically operated to clamp on the first DF1 and second DF2 brake discs of the front wheel FW.

Referring to the example in FIG. 1, the first P1R and the at least a second P2R brake calipers associated with the rear wheel RW are brake calipers actuated by pressure to clamp on the third DF3 and fourth DF4 brake discs of the rear wheel RW. In a different embodiment, the aforesaid first P1R and the at least a second P2R brake calipers associated with the rear wheel RW can be electrically operated brake calipers, i.e., they are similar to the brake calipers P1F, P2F associated with the front wheel FW.

Referring to the example in FIG. 1, the braking system 100 comprises an electronic braking control unit 10 (Electronic Control Unit or ECU). Such an electronic braking control unit 10 is configured to operate all the brake calipers P1F, P2F, P1R, P2R of the braking system 100. In a different embodiment, the braking system 100 can comprise two or more, mutually similar electronic braking control units 10. For example, in the case of a system 100 comprising two electronic braking control units 10, one control unit is configured to operate the brake calipers P1F, P2F associated with the front wheel FW, and the other control unit is configured to operate the brake calipers P1R, P2R associated with the rear wheel RW.

Referring to the example of system 100 in FIG. 1, the aforesaid electronic braking control unit 10 comprises, for example, a microcontroller or microprocessor, and is configured to generate electrical signals to actuate the brake calipers P1F, P2F, P1R, P2R of the braking system 100 to impact brake commands to the calipers.

In particular, such an electronic braking control unit 10 is configured to enable or generate a first S1 and a second S2 electrical actuation signal to actuate the first P1F and the at least a second P2F brake calipers associated with the front wheel FW of the motorbike 1. In particular, the first S1 and second S2 electric actuation signals directly control the electric motors which actuate the first P1F and the at least a second P2F brake calipers.

Based on the enabling of such first S1 and second S2 electrical actuation signals, the first P1F and the at least a second P2F brake calipers are configured to apply a first F1 and a second F2 braking torque to the front wheel FW of the motorbike 1.

Furthermore, the electronic braking control unit 10 is configured to enable or generate a further first S1' and a further second S2' electrical actuation signal of a first A1 and a second A2 actuator module, in particular of the electro-hydraulic type, of the braking system 100. Each of such first A1 and second A2 actuator modules is configured to generate a respective actuation pressure, representative of the further first S1' and further second S2' electrical signals, to actuate the first P1R and the at least a second P2R brake calipers associated with the rear wheel RW of the motorbike 1.

In other words, based on the enabling of such further first S1' and further second S2' electrical actuation signals, the first P1R and the at least a second P2R brake calipers are configured to apply a respective first F3 and a respective second F4 braking torque to the rear wheel RW of the motorbike 1.

For the purposes of the present invention, the aforesaid brake calipers P1F, P2F, P1R, P2R can be either "dry" or "wet" type calipers.

The operational steps of a method 200 for controlling a braking system 100 of a vehicle 1, in particular a motorcycle, such as a motorbike, for example, for the distribution of braking torques F1, F2, F3, F4 for service braking on a first P1F, P1R and at least a second P2F, P2R brake caliper operatively associated with one or more wheels FW, RW of the motorcycle 1 are described below with reference to FIG. 2.

The electronic control unit 10 of the braking system 100 described above is configured to implement such a control method 200.

In a general embodiment, the electronic braking control unit 10 is arranged to execute the codes of an application program, which implements the method 200 of the present invention.

In a particular embodiment, the processor of the electronic control unit 10 is configured to load, in a respective memory block, and execute the codes of the application program which implements the method 200 of the present invention.

Figure 2:
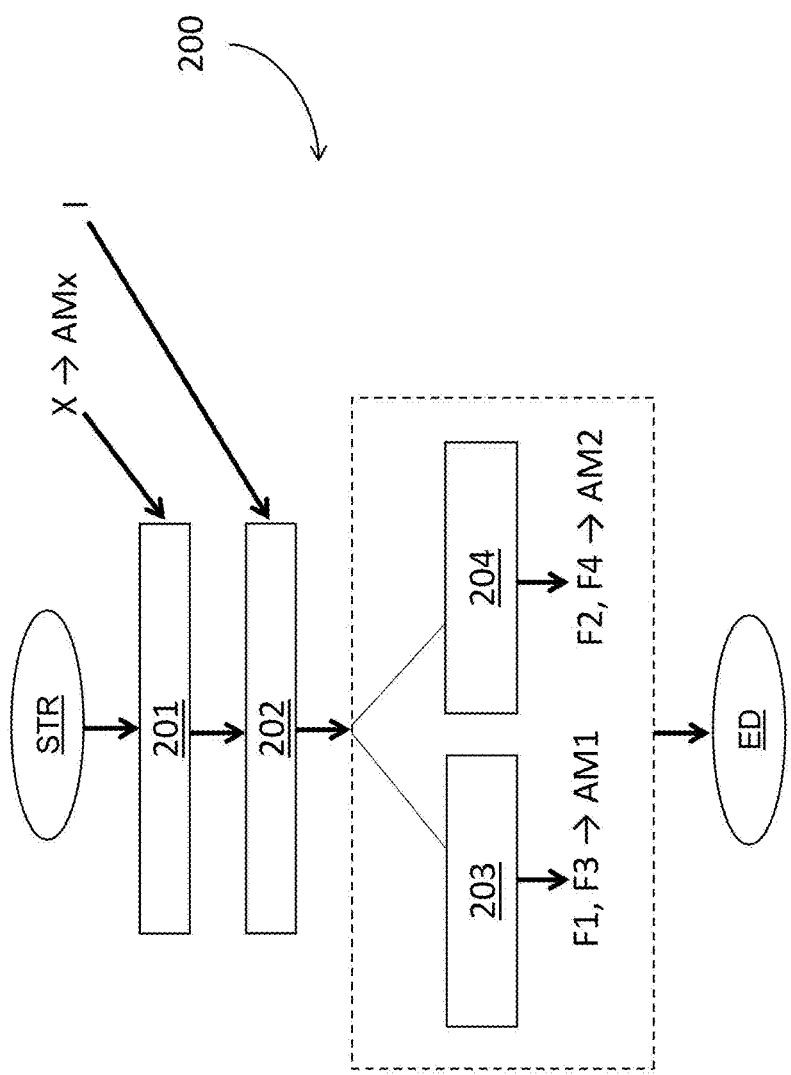
FIG. 2 shows, in a flowchart, an embodiment of the method for controlling the distribution of braking torques in the braking system in FIG. 1 according to the present invention.

The control method 200 in FIG. 2 begins with a symbolic step of starting "STR" and ends with a symbolic step of ending "ED".

In the most general embodiment, the control method 200 comprises a step of receiving 201, by the electronic control unit 10, a request for applying a braking torque X for service braking upon a braking action applied by a rider to a lever 2 or pedal of the braking system 100 of the motorbike 1. Hereafter, the term braking torque X for service braking will be understood to mean both a torque applied by the calipers to stop the vehicle and a torque applied by the calipers to decelerate the vehicle. In particular, the application of such a braking torque X is required during a braking time interval T.

Furthermore, the control method 200 comprises a step of detecting information I representative of the operating conditions of the vehicle 1.

The control method 200 includes a step of enabling 202, in the braking time interval T, by the electronic control unit 10:
- a first electrical actuation signal S1, S1' of the first P1F, P1R brake caliper, or
- at least a second electrical actuation signal S2, S2' of the at least second P2F, P2R brake caliper, or
- both the first S1, S1' and the at least a second S2, S2' electrical actuation signals, based on the detection of the information I representative of the operating conditions of the motorbike 1.

In the described embodiment, it is assumed that the same control logic can be applied to the two calipers P1F, P2F of the front wheel FW and the two calipers P1R, P2R of the rear wheel RW, in a mutually independent manner.

In an embodiment, the aforesaid information I representative of the operating conditions of the motorbike 1 comprise:
- a first piece of information I1 representative of an operating temperature of a caliper (or the pad) associated with a front or rear wheel FW, RW of the motorbike 1;
- a second piece of information I2 representative of the weight of the motorbike 1;
- a third piece of information I3 representative of a coefficient of friction between the motorbike 1 and the road, i.e., information of the road grip.

For example, the estimation of the operating temperature of the caliper (or pad) associated with the wheel FW, RW is achievable by employing a thermal model configured to provide the estimated temperature based on the initial external temperature measured by a force/pressure sensor associated with the wheel corner of the motorbike 1 and a signal of PWM (Pulse Width Modulation) voltage and/or current applied by the corner. In an embodiment, the force/pressure sensor can be associated with a caliper and/or actuator.

The estimation of the weight of the motorbike 1 can also be obtained by an internal algorithm and/or from sensors associated with the suspension or other sensors.

Furthermore, the estimation of the road friction coefficient MURoad can be calculated based on the mathematical relationship:

$$MuRoad = Fground/Fz$$

where the first force parameter Fground is calculated through the feedback signal of force and/or pressure of the actuator and the acceleration of the wheel, and the second force parameter Fz is calculated by knowing the vehicle weight, the vehicle construction data, and the deceleration that the motorbike 1 performs at a given instant.

It is worth noting that a further piece of information representative of an operating condition of the motorbike 1 is an estimation of the pad wear of the two calipers. An appropriate algorithm is employed to estimate the wear of the pads and the method of the invention, knowing this information, is configured to distribute the braking torque so as to optimize the wear and, if required, make it uniform over the two pads by applying more pressure on the caliper having a less worn pad.

Furthermore, in relation to the pad temperature estimation, the method of the invention appropriately distributes the braking torques by more frequently actuating the caliper having a lower pad temperature to avoid fading phenomena. Meanwhile, the pad of the other caliper is allowed to cool down and become operational again when the respective operating temperature is lower than the pad temperature of the caliper being actuated.

In relation to the use of road/wheel friction coefficient information: in the case of low grip (i.e., in the case of low braking torques involved), the method of the invention is configured to actuate a single caliper, so as to increase the control resolution on the wheel and have a more precise braking torque modulation by increasing comfort/control of wheel slip.

Afterward, the control method 200 includes a step of applying 203, by the first brake caliper P1F, P1R, a first braking torque F1, F3 to the wheel FW, RW of the motorbike 1, once said first electrical actuation signal S1, S1' has been enabled.

Furthermore, alternatively, the control method 200 includes applying 204, by the at least a second P2F, P2R brake caliper, a second braking torque F2, F4 to the wheel FW, RW of the motorbike 1, once said at least a second electrical actuation signal S2, S2' has been enabled.

It is worth noting that the steps of applying 203, 204 can be concurrent or can be implemented in sequence by the electronic control unit 10 based on the activation/deactivation times of the above-mentioned electrical actuation signals S1, S2, S1', S2'. In particular, the control method 200 includes an alternative step of applying 203, 204, by the first P1F, P1R, and second P2F, P2R brake calipers, both the first F1, F3, and second F2, F4 braking torques to the wheel FW, RW of the vehicle 1, once such first S1, S1' and at least a second S2, S2' electrical actuation signals have been enabled.

The control method 200 of the invention includes that for each instant of the braking time interval T, the sum of a first amplitude AM1 of the first F1, F3 braking torque and a second amplitude AM2 of the second F2, F4 braking torque is equal to an amplitude AMx of the braking torque X required for service braking.

The control method 200 of the invention advantageously allows the braking torques generated by each brake caliper to be decoupled, so that only one caliper can generate torque when low levels of force are required, so as to increase the "resolution" of the caliper control and thus generate a softer torque which increases the rider's feeling especially on light vehicles and surfaces with low coefficient of friction.

When the amplitude of the required torque X by the rider with the braking action continues to increase, the method 200 includes generating braking torques on the remaining calipers defined based on coordination logics which can differ depending on different scenarios and different types of braking which can occur.

In an embodiment, each of the above-mentioned first F1, F3 and second F2, F4 braking torques applied to the wheel FW, RW of the motorbike 1 comprises a torque having constant amplitude AM1, AM2 in the braking time interval T or in portions of such a braking time interval T.

In another embodiment, each of such first F1, F3, and second F2, F4 braking torques comprises a torque having a continuously varying amplitude AM1, AM2 in the braking time interval T or in portions of the braking time interval T.

Referring to FIGS. 3A-3B, a first example of braking pair decoupling implemented through the method 200 of the invention in the case of a progressive longitudinal braking is described.

In particular, FIG. 3A shows, as a function of time, a braking torque X required for service braking upon a braking action applied by the rider to a lever 2 or pedal of the vehicle braking system. In this case, the required braking torque X has a substantially constant amplitude AMx in average value, e.g., about 350 Nm, in the braking time interval T.

As known, the linear mathematical relationship linking the actuator torque, Tatt, to the actuator force, Fatt, can be expressed as:

$$Fatt=Tatt/(2*RD*CoeffAt)$$

where Fatt=actuator force, Tatt=actuator torque, RD=disc radius, CoeffAt=pad friction coefficient.

In such a case, the step of enabling 202 of the control method 200 described above comprises a further step of enabling the at least a second electrical actuation signal S2, S2' of said at least second brake caliper P2F, P2R during a first time interval T1 of said braking time interval T to apply the second braking torque F2, F4 to the wheel FW, RW of the motorbike 1; such a second braking torque F2, F4 has a respective second constant amplitude AM2 during the first T1 time interval, e.g., about 180 Nm.

Furthermore, there is included a step of enabling the first electrical actuation signal S1, S1' of the first P1F, P1R brake caliper during a second time interval T2 of said braking time interval T following the first time interval T1, to apply also the first braking torque F1, F3 having a respective first continuously varying amplitude AM1 in the second time interval T2 to the wheel FW, RW of the motorbike 1. In such a case, the second braking torque F2, F4 has the respective second constant amplitude AM2 in average value (e.g., about 180 Nm) in the second time interval T2.

In particular, the amplitude AMx of the braking torque X required for service braking is equal to the sum, for each instant of the second time interval T2 of the braking time interval T, of the respective second amplitude AM2 of the second braking torque F2, F4 and the respective first amplitude AM1 of the first braking torque F1, F3.

A second example of braking torque decoupling implemented through the control method 200 of the invention, again in the case of progressive longitudinal braking, is described with reference to FIGS. 4A-4B.

In particular, FIG. 4A illustrates, as a function of time, a braking torque X required for service braking upon a braking action applied by the rider to a lever 2 or pedal of the vehicle braking system. Unlike the preceding example, in this second example, the required braking torque X is highly variable in the braking time interval T and has an amplitude AMx which takes values less than an average value (e.g., less than 100 Nm) during a first T1 and a third T3 time interval of said braking time interval T and values greater than said average value (e.g., greater than 100 Nm) during a second T2 time interval of said braking time interval T. The second time interval T2 is interposed between the first T1 and third T3 time intervals.

In such a case, the step of enabling 202 of the control method 200 described above comprises a further step of enabling the first electrical actuation signal S1, S1' of the first P1F, P1R brake caliper during the first T1 time interval of the braking time interval T to apply the first braking torque F1, F3 to the wheel FW, RW of the motorbike 1; such a first braking torque F1, F3 has a respective first continuously varying amplitude AM1 in the first time interval T1.

In such a case, for each instant of the first time interval T1, the first amplitude AM1 of the first braking torque F1, F3 is equal to the amplitude AMx of the braking torque X required for service braking. In such a case, the at least a second S2, S2' electrical actuation signal remains disabled.

Furthermore, there is included a step of enabling the at least a second electrical actuation signal S2, S2' of the at least second P2F, P2R brake caliper during the second time interval T2 of the braking time interval T following the first time interval T1, to apply to the wheel FW, RW of the motorbike 1 also the second F2, F4 braking torque having a respective second continuously varying amplitude AM2 in the second time interval T2; the first braking torque F1, F3 has the respective first constant amplitude AM1 in the second time interval T2, e.g., equal to about 180 Nm.

In such a case, for each instant of the second time interval T2, the amplitude AMx of the braking torque X required for service braking is equal to the sum of the respective first amplitude AM1 of the first braking torque F1, F3 and the respective second amplitude AM2 of the second braking torque F2, F4.

Furthermore, the control method 200 includes a step of disabling the second electrical actuation signal S2, S2' of the at least second P2F, P2R brake caliper during a third time interval T3 of the braking time interval T following the second time interval T2, to apply to the wheel FW, RW of the motorbike 1 only the first F1, F3 braking torque having the respective first continuously varying amplitude AM1 in the third time interval T3; the second braking torque F2, F4 has the zero second amplitude AM2 in the third time interval T3.

In such a case, for each instant of the third time interval T3, the first amplitude AM1 of the first braking torque F1, F3 is equal to the amplitude AMx of the braking torque X required for service braking.

As seen, the first brake caliper P1F, P1R generates a torque on the wheel FW, RW up to a given threshold, after which only the second brake caliper P2F, P2R is controlled, leading to the generation of a better feeling for the rider given by a softer distribution of the torques on the wheel.

In the case of high-performance braking, such as the ABS braking could be, a decoupled management of the braking torques on the same wheel FW, RW allows better control of the wheel slip, working closer and closer to the tire limit, increasing performance and decreasing stopping distances.

Referring to FIGS. 5A-5B, a third example of braking torque decoupling implemented by the control method 200 of the invention in the case of high-performance braking is described.

In particular, FIG. 5A shows, as a function of time, a request for braking torque X for service braking generated by an ABS algorithm upon a braking action applied by the rider to a lever 2 or pedal of the braking system 100 of the vehicle. In this case, the required braking torque X has amplitude AMx in average value which gradually increases in the braking time interval T, e.g., from about 1000 Nm to 1800 Nm.

In such a case, the step of enabling 202 of the control method 200 described above comprises a further step of enabling the at least a second electrical actuation signal S2, S2' of said at least second P2F, P2R brake caliper during the braking time interval T to apply the second braking torque F2, F4 to the wheel FW, RW of the motorbike 1; such a second braking torque F2, F4 has a respective second continuously varying amplitude AM2 in the time interval T.

Furthermore, there is included a step of enabling the first electrical actuation signal S1, S1' of the first P1F, P1R brake caliper during a first time interval T1 of the braking time interval T to apply the first braking torque F1, F3 to the wheel FW, RW of the motorbike 1; such a first braking torque F1, F3 has a respective first continuously varying amplitude AM1 in the first time interval T1.

In such a case, for each instant of the first time interval T1, the amplitude AMx of the braking torque X required for service braking is equal to the sum of the respective second amplitude AM2 of the second braking torque F2, F4 and the respective second amplitude AM1 of the first braking torque F1, F3.

Furthermore, there is included a step of applying to the wheel FW, RW of the motorbike 1, during a second time interval T2 of the braking time interval T following the first time interval T1, the first braking torque F1, F3 having the first constant amplitude AM1 in the second time interval T2, e.g., 450 Nm.

In such a case, for each instant of the second time interval T2, the amplitude AMx of the braking torque X required for service braking is equal to the sum of the respective second amplitude AM2 of the second braking torque F2, F4 and the respective first amplitude AM1 of the first braking torque F1, F3.

Afterward, there is included a step of applying to the wheel FW, RW of the motorbike 1, during at least a third time interval T3, T4, T5, T6 of the braking time interval T following the second time interval T2, a further first braking torque F1', F3' having a respective further first constant amplitude AM1' in said at least a third time interval T3, T4, T5, T6. Referring to FIG. 5B, for example, incremental values of about 500 Nm, 600 Nm, 700 Nm, 800 Nm can be seen.

It is worth noting that the amplitude AM1' of the further first braking torque F1', F3' applied in the at least a third time interval T3, T4, T5, T6 is greater than the amplitude AM1 of the first braking torque F1, F3 applied in the second time interval T2.

In such a case, for each instant of the at least a third time interval T3, T4, T5, T6, the amplitude AMx of the braking torque X required for service braking is equal to the sum of the second amplitude of the second braking torque F2, F4 and the further first amplitude AM1' of the further first braking torque F1', F3'.

As shown in FIG. 5B, the braking torques applied to the wheel discs are broken down into a "fixed" component (provided by the second brake caliper P2F, P2R) and a "variable" component, in particular having a varying amplitude provided by the first brake caliper P1F, P1R which depends on the slip control. Thereby, it is possible to increase the torque resolution which can be generated on the wheel allowing the system to be more effective and responsive.

Again, with reference to FIG. 5B, in a respective time interval T7 of the braking time interval T, both the first F1, F3 and the second F2, F4 braking torques, equal to each other, are expected to be applied to the wheel FW, RW of the motorbike 1. In such a case, for each instant of the time interval T7, the amplitude AMx of the braking torque X required for service braking substantially corresponds to twice the respective second amplitude AM2 of the second braking torque F2, F4.

In addition to the advantages mentioned above, the control method 200 of the invention has several other advantageous aspects.

Indeed, the control method 200 for managing the braking torque on a single wheel generated by two or more calipers allows maximizing:
- performance: it is always possible to operate the two calipers at their best efficiency/performance point;
- feeling: it is also possible to brake with only one of the calipers present so as to increase the braking modularity;
- possible failure management: having one or more individually controlled calipers allows compensating for a failure by increasing the braking torque on the working calipers.

In an embodiment, it is worth noting that the aforesaid braking torque required for service braking in FIGS. 3A, 4A, 5A could be a service braking required based on different control logics, such as an automatic emergency braking or a "Hill Holder"-type braking.

Automatic emergency braking occurs, for example, when the braking system of a vehicle detects, for example by using radars or sensors, that a collision with other vehicles might occur. In this case, based on the comparison of the space interposed between the vehicles to the deceleration applied, the system is configured to predict the occurrence of a collision by implementing an automatic braking.

On the other hand, a "Hill Holder"-type braking request corresponds to a request to keep the vehicle in a stationary condition with the brakes without the user actively holding the pedal/lever. In particular, the user stops the vehicle with a classic service braking by acting on lever 2 or pedal; once the vehicle is stopped and the braking action applied to lever 2 or pedal is released, a braking system logic is configured to recognize the slope of the road, deciding which torques to implement on the wheels to keep the vehicle stationary. The slope of the road can be estimated, for example, through an inertial navigation system or IMU.

The invention claimed is:

1. A method for controlling a braking system of a vehicle for the distribution of braking torques for service braking, wherein such a braking system comprises:
   a first and at least a second brake caliper associated with both a front wheel and a rear wheel of the vehicle, or
   a first and at least a second brake caliper associated with a front wheel of the vehicle and a single brake caliper associated with a rear wheel of the vehicle, or
   a first and at least a second brake caliper associated with a rear wheel of the vehicle and a single brake caliper associated with a front wheel of the vehicle, at least one electronic control unit for actuating said first and at least second brake calipers, the method comprising the steps of:
receiving, by said at least one electronic control unit, a request to apply a braking torque for service braking upon a braking action applied to a lever or pedal of the braking system of the vehicle, the application of said braking torque being required during a braking time interval;

detecting information representative of vehicle operating conditions;

enabling, in said braking time interval, by the electronic control unit:
a first electrical actuation signal of said first brake caliper, or
at least a second electrical actuation signal of said at least second brake caliper, or
both said first and said at least a second electrical actuation signal,
based on the detection of information representative of vehicle operating conditions;
applying by the first brake caliper a first braking torque to the wheel of the vehicle, once said first electrical actuation signal has been enabled, or
applying by the at least a second brake caliper a second braking torque to the wheel of the vehicle, once said at least a second electrical actuation signal has been enabled, or
applying by the first and second brake calipers both the first and second braking torques to the wheel of the vehicle, once said first and at least a second electrical actuation signals have been enabled,
wherein, for each instant of the braking time interval, an amplitude of the braking torque required for service braking is equal to the sum of a first amplitude of the first braking torque and a second amplitude of the second braking torque.

2. The method for controlling a braking system of a vehicle according to claim 1, wherein said information representative of operating conditions of the vehicle comprises:
a first piece of information representative of an operating temperature of a caliper or pad associated with a wheel of the vehicle;
a second piece of information representative of the weight of the vehicle;
a third piece of information representative of a coefficient of friction between the vehicle and the road.

3. The method for controlling a braking system of a vehicle according to claim 1, wherein each of said first and second braking torques applied to the wheel of the vehicle comprises:
a torque having constant amplitude in the braking time interval or in portions of such a braking time interval, and/or
a torque having continuously varying amplitude in the braking time interval or in portions of such a braking time interval.

4. The method for controlling a braking system of a vehicle according to claim 1, wherein the required braking torque has constant amplitude in average value in the braking time interval and said step of enabling comprises the steps of:
enabling the at least a second electrical actuation signal of said at least second brake caliper during a first time interval of said braking time interval to apply the second braking torque to the wheel of the vehicle, said second braking torque having the second constant amplitude in said first time interval;
enabling the first electrical actuation signal of the first brake caliper during a second time interval of said braking time interval following the first time interval, to apply to the wheel of the vehicle also the first braking torque having the first continuously varying amplitude in the second time interval, said second braking torque having the second constant amplitude in average value in the second time interval,
wherein, for each instant of the second time interval of the braking time interval, the amplitude of the braking torque required for service braking is equal to the sum of the second amplitude of the second braking torque and the first amplitude of the first braking torque.

5. The method for controlling a braking system of a vehicle according to claim 1, wherein the required braking torque has amplitude which takes values lower than an average value during a first and a third time interval of the braking time interval and values greater than an average value during a second time interval of the braking time interval interposed between said first and third time intervals, and wherein said step of enabling comprises the steps of:
enabling the first electrical actuation signal of said first brake caliper during the first time interval of said braking time interval to apply the first braking torque to the wheel of the vehicle, said first braking torque having the first continuously varying amplitude in said first time interval,
for each instant of the first time interval, the first amplitude of the first braking torque being equal to the amplitude of the braking torque required for service braking.

6. The method for controlling a braking system of a vehicle according to claim 5, further comprising the step of:
enabling the at least a second electrical actuation signal of the at least second brake caliper during the second time interval of said braking time interval following the first time interval, to apply to the wheel of the vehicle also the second braking torque having the second continuously varying amplitude in the second time interval, said first braking torque having the first constant amplitude in the second time interval,
wherein, for each instant of the second time interval, the amplitude of the braking torque required for service braking is equal to the sum of the first amplitude of the first braking torque and the second amplitude of the second braking torque.

7. The method for controlling a braking system of a vehicle according to claim 6, further comprising the step of:
disabling the at least a second electrical actuation signal of the at least second brake caliper during a third time interval of said braking time interval following the second time interval, to apply to the wheel of the vehicle only the first braking torque having the first continuously varying amplitude in the third time interval, said second braking torque having the zero second amplitude in the third time interval,
wherein, for each instant of the third time interval, the first amplitude of the first braking torque being equal to the amplitude of the braking torque required for service braking.

8. The method for controlling a braking system of a vehicle according to claim 1, wherein the required braking torque has amplitude in gradually increasing average value in the braking time interval, and wherein said step of enabling comprises the steps of:
enabling the at least a second electrical actuation signal of said at least second brake caliper during the braking time interval to apply the second braking torque to the wheel of the vehicle, said second braking torque having the second continuously varying amplitude in said braking time interval;

enabling the first electrical actuation signal of said first brake caliper during a first time interval of said braking time interval to apply the first braking torque to the wheel of the vehicle, said first braking torque having the first continuously varying amplitude in said first time interval, wherein, for each instant of the first time interval, the amplitude of the braking torque required for service braking is equal to the sum of the second amplitude of the second braking torque and the first amplitude of the first braking torque.

9. The method for controlling a braking system of a vehicle according to claim 8, further comprising the step of:

applying to the wheel of the vehicle, during a second time interval of said braking time interval following the first time interval, the first braking torque having the first constant amplitude in the second time interval, wherein, for each instant of the second time interval, the amplitude of said braking torque required for service braking is equal to the sum of the second amplitude of the second braking torque and the first amplitude of the first braking torque.

10. The method for controlling a braking system of a vehicle according to claim 9, further comprising the step of:

applying to the wheel of the vehicle, during at least a third time interval of said braking time interval following the second time interval, a further first braking torque having a further first constant amplitude in said at least a third time interval, wherein the further amplitude of the further first braking torque applied in the at least a third time interval is greater than the amplitude of the first braking torque applied in the second time interval, wherein, for each instant of the at least a third time interval, the amplitude of said braking torque required for service braking is equal to the sum of the second amplitude of the second braking torque and the further first amplitude of the further first braking torque.

11. The method for controlling a braking system of a vehicle according to claim 1, wherein said vehicle is chosen from the group consisting of: a motorcar, a motorbike, a light commercial vehicle, a heavy industrial vehicle.

12. A braking system of a vehicle comprising:

a first and at least a second brake caliper associated with both a front wheel and a rear wheel of the vehicle, or a first and at least a second brake caliper associated with a front wheel of the vehicle and a single brake caliper associated with a rear wheel of the vehicle, or a first and at least a second brake caliper associated with a rear wheel of the vehicle and a single brake caliper associated with a front wheel of the vehicle, at least one electronic control unit for actuating said first and at least second brake calipers for distributing braking torques applied to said wheel of the vehicle for service braking, wherein said electronic control unit of the braking system is configured to perform the steps of the method according to claim 1.

13. A computer program comprising an application code executable by an electronic control unit of a braking system of a vehicle to implement the method according to claim 1.

* * * * *